(12) United States Patent
Brandin et al.

(10) Patent No.: US 8,496,170 B2
(45) Date of Patent: Jul. 30, 2013

(54) CONTACTLESS PORTABLE OBJECT CAPABLE OF PROVIDING AN INDICATION ON THE PERFORMANCE OF A CONTACTLESS READER

(75) Inventors: Guillaume Brandin, Roquefort les Pins (FR); Serge Manigault, Caluire et Cuire (FR)

(73) Assignee: ASK S.A., Valbonne-Sophia Antipolis (FR)

( * ) Notice: Subject to any disclaimer, the term of this patent is extended or adjusted under 35 U.S.C. 154(b) by 146 days.

(21) Appl. No.: 12/415,080

(22) Filed: Mar. 31, 2009

(65) Prior Publication Data

US 2009/0250517 A1    Oct. 8, 2009

(30) Foreign Application Priority Data

Mar. 31, 2008  (FR) .................................. 08 01769

(51) Int. Cl.
*G06K 7/00*   (2006.01)
*G06K 19/06*  (2006.01)

(52) U.S. Cl.
USPC .......................................... 235/439; 235/492

(58) Field of Classification Search
USPC .......................... 235/487, 492, 435, 439, 451; 340/572.1–572.8
See application file for complete search history.

(56) References Cited

U.S. PATENT DOCUMENTS

| | | | |
|---|---|---|---|
| 6,923,380 B2* | 8/2005 | Nakabe et al. | 235/492 |
| 7,233,250 B2* | 6/2007 | Forster | 340/572.8 |
| 7,518,515 B2* | 4/2009 | Trosper | 340/572.1 |
| 7,762,469 B2* | 7/2010 | Sueoka et al. | 235/492 |
| 7,965,186 B2* | 6/2011 | Downie et al. | 340/572.1 |
| 2006/0160488 A1 | 7/2006 | Sueoka et al. | 455/41.2 |
| 2006/0187040 A1 | 8/2006 | Sweeney | 340/572.1 |

\* cited by examiner

*Primary Examiner* — Thien M Le
*Assistant Examiner* — April Taylor
(74) *Attorney, Agent, or Firm* — James C. Lydon

(57) ABSTRACT

The invention concerns a contactless portable object (11) featuring an electronic circuit (14) and an antenna (12) connected together enabling coupling between the electronic circuit and a reader associated with the portable contactless object. According to the main characteristic of the invention, the contactless portable object includes a set of field indicators (18) that provide the user with a measurement of the value of a physical quantity proportional to the quantity of the electromagnetic field which passes through the antenna (12).

8 Claims, 2 Drawing Sheets

CONTACTLESS PORTABLE OBJECT CAPABLE OF PROVIDING AN INDICATION ON THE PERFORMANCE OF A CONTACTLESS READER

This invention concerns contactless, i.e. remote, communication between contactless portable objects and an associated reader and specifically concerns a contactless portable object capable of providing an indication on the performance of a contactless reader.

Portable contactless objects designate all devices capable of communicating remotely with a suitable reader. These objects may be smart cards, badges, identification booklets such as passports, identity cards as well as rings, bracelets, tokens, etc. Because of this, contactless communication currently exists in several fields today, such as access control, payment transactions and identification of persons and objects, etc. Contactless communications occur through coupling between the antenna of the portable object and that of the reader by modulation of the electromagnetic field emitted by the reader which can either be a field where the electric component prevails, in this case it is the very high frequency range, or a field where the magnetic component prevails and, in this case, it is about varying a magnetic field produced by an induction coil in the radio frequency range such as the standardized frequency of 13.56 MHz. It is the latter frequency range that is considered here. These contactless portable objects are either active and in this case they include a built-in battery, or passive when they are remotely powered by the reader.

We consider here the field of contactless portable objects referred to as "passive". When the contactless portable object enters the electromagnetic field emitted by the reader, the antenna of the object transforms the field into an electromagnetic flow, then into an induced current. The object thus receives energy which allows it to communicate in return with the reader and to thus recognize an identification code, enable accesses, make a payment, etc. according to the function of the object.

The communication is established with the portable object at a certain distance from the reader as soon as the value of the electromagnetic field is sufficient. The effectiveness of contactless communication by induction depends on the level of the electromagnetic field received by the portable object and particularly when it must be remotely powered. Depending on the location where the object is placed in the field emitted by the reader, the level of the field is different and the effectiveness of the communication observed is also fluctuating. It is interesting to determine the value of the electromagnetic field emitted by the reader to know its effectiveness as well as to test the behavior of the reader when communicating with a contactless portable object designed to communicate with the latter.

The field levels required for this contactless communication are specified in the ISO/IEC 14443 standard. A card complying with this standard must operate when the reader delivers to it a field of 1.5 A/m. A reader complying with this standard must be able to deliver to this card a field of 1.5 A/m when the latter is placed in the operating volume specified by its manufacturer.

Electromagnetic field detectors and specifically portable electromagnetic field measuring devices are available. These measuring devices are generally powered by the mains or by a battery and are therefore not passive devices.

There also exist cards equipped with a light emitting device such as an LED (light emitting diode) so that the LED comes on when the card enters an electromagnetic field. These devices do not provide the value of the electromagnetic field and do not allow to estimate the power of the electromagnetic field emitted by a reader in operating condition.

The devices described above do not give any indication on the behavior of the contactless communication between two remote devices such as a reader and a contactless portable object held by a user.

This is why the purpose of the invention is to provide a portable and contactless device capable of giving the electromagnetic field level in which it is buried and to provide an indication reflecting the actual behavior of the use of systems based on a contactless reader.

The device according to the invention has the advantage of behaving in the field of the reader as a portable object designed to communicate with the reader.

The object of the invention is therefore a contactless portable object featuring an electronic circuit and an antenna connected together enabling coupling between the electronic circuit and a reader associated with the portable contactless object. According to the main characteristic of the invention, the contactless portable object includes an assembly of field indicators that provides to the user a measurement of the value of a physical quantity proportional to the quantity of the electromagnetic field which passes through the antenna.

The purposes, objects and characteristics of the invention will become more apparent from the following description when taken in conjunction with the accompanying drawings in which.

Figure 1:
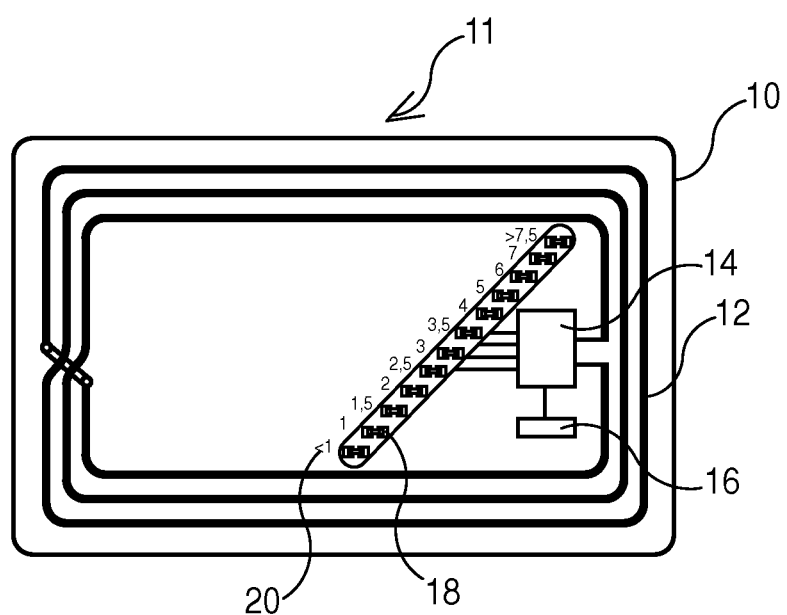
FIG. 1 represents a diagrammatic view of the contactless portable object according to the invention.

The portable contactless object 11 includes a support 10, preferably in the format of a credit card type smart card i.e. 85.6 mm×54 mm (according to the ISO7810-ID1 standard), but could also be of a different format, for example in the format of an identity booklet such as a passport. In the description that follows, the portable contactless object according to the invention is referred to as contactless card. The support is a plate manufactured from composite materials such as epoxy type resin, bakelite, or else PVC, PET or PEG type plastic. Preferably, the support 10 is made of epoxy glass. The support 10 features on one of its sides, a copper antenna 12, an electronic circuit 14 and a user interface 16. The object also features an assembly of field indicators 18. The antenna 12, the circuit 14, the interface 16 and the field indicators are electrically connected. The field indicators are either visual means or audible means and form a scale of graduations so that each indicator is associated with a value or a range of values of a measured physical quantity. The measure of the physical quantity is explained in detail later in the description. In a preferred embodiment of the invention, the indicators are visual means and are marked by at least 2 light emitting diodes (commonly referred to as LED). Preferably, there are 12 diodes. On FIG. 1, each diode (or LED) is preceded by a value between 1 and 7.5 symbolizing Amperes per meter that corresponds to the measurement of a magnetic field.

The antenna 12 features 3 concentric turns in copper that follow the contour of the support 10, the width of turns being approximately 1 mm and the spacing approximately 1 mm. The choice of 3 antenna turns is intended to correspond to the behavior of a contactless smart card representative of portable contactless objects. The dimension of the outer turn is approximately 80 mm×50 mm. The antenna 12 can feature one or more turns without necessarily deviating from the scope of the invention. According to the preferred embodiment of the invention described herein, the antenna 12 as well as the links between the electronic components and the antenna form a printed circuit. However, the turns can be made by screen printing, flexography, rotogravure, offset printing or inkjet printing with epoxy type conductive ink loaded with conductive particles such as for example silver or gold or with a conductive polymer. In this case, the antenna support is made of paper, synthetic paper or plastic.

The contactless card according to the invention can also include a user interface 16 used to modify the programmable part of the circuit 14.

Figure 2:
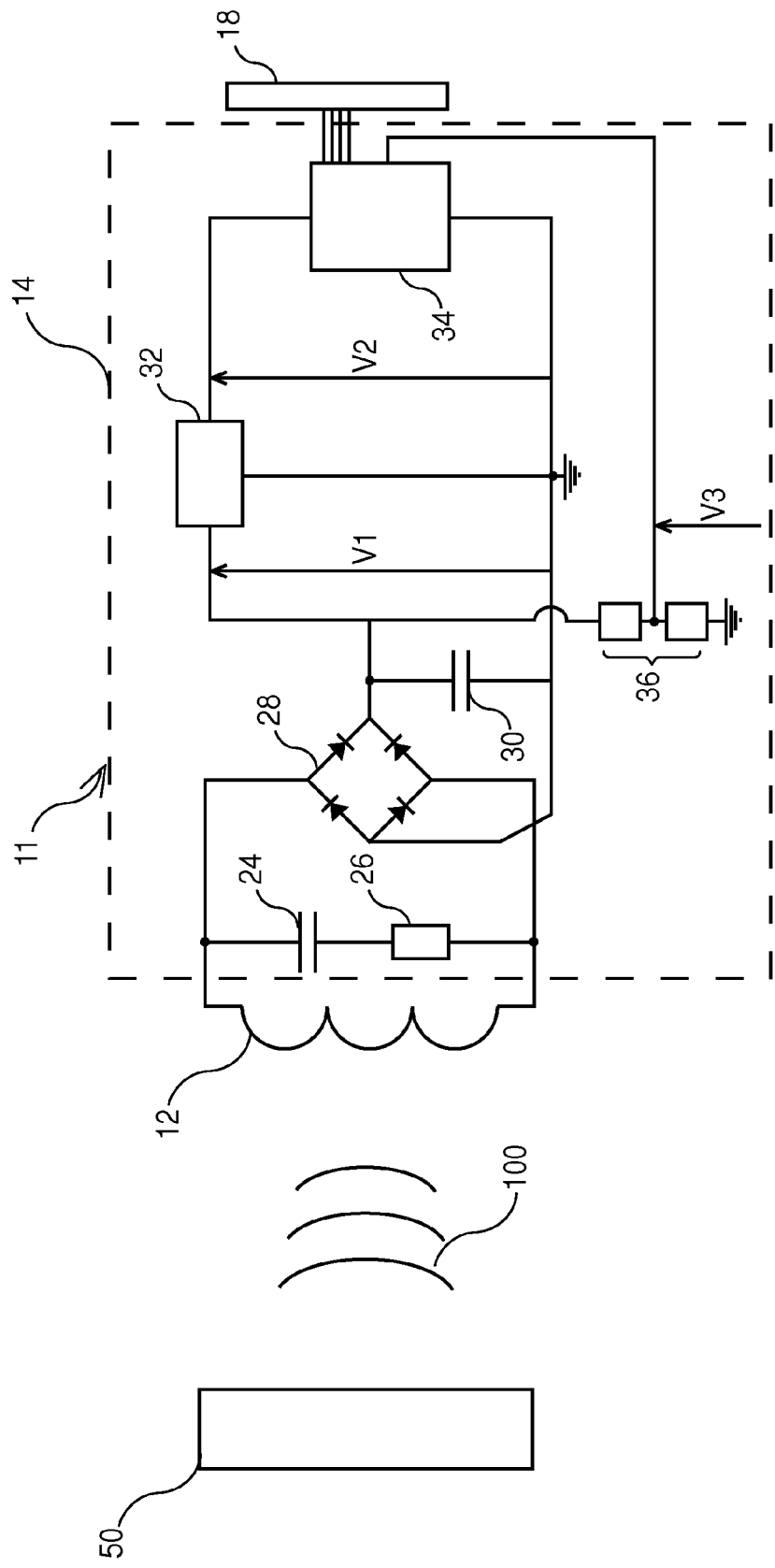
FIG. 2 represents the circuit diagram of the contactless portable object according to the invention.

On FIG. 2, the reader 50 is designed to emit an electromagnetic field 100 at a determined carrier frequency, for example at 13.56 MHz. The contactless card 11 according to the invention receives the electromagnetic energy by means of an antenna 12 of an RLC circuit tuned to the carrier frequency when an electromagnetic flow is received by the antenna 12. An example of the embodiment of the electronic circuit 14 connecting the antenna 12 to the set of indicators 18 of the contactless card according to the invention is represented by a detailed circuit diagram and helps understand how the field indicators are activated when the card is exposed to an electromagnetic field. The antenna 12, the capacitor 24 and the resistance 26 form an oscillating circuit tuned to the frequency of the reader, i.e. 13.56 MHz. The role of the capacitor 24 is to provide a tuning capacitor enabling the contactless card according to the invention to resonate and associate itself with the reader when it is placed in the electromagnetic field produced by the latter, in the same fashion when contactless portable objects designed to communicate with the reader resonate with it. The frequency at which resonance occurs, that is the frequency at which the smart card's circuit according to the invention and the reader are tuned, is equal to 13.56 Megahertz (MHz) according to current standards.

The role of the diode bridge rectifier 28 and the capacitor 30 is to rectify and smoothen the alternating signal available at the terminals of the oscillating circuit. The voltage V1 obtained at the output is continuous but depends on the electromagnetic field 100 in which the antenna is exposed. A regulator 32 enables to regulate this voltage in order to obtain a continuous and stable voltage V2, i.e. not depending on the electromagnetic field 100 in which the antenna is exposed, and used to power a microcontroller 34. The microcontroller 34 contains the memory and an analog to digital converter (ADC=Analog to Digital Converter). The voltage V1 at the output of the oscillating circuit is divided by means of a dividing bridge 36 so that it can be read by the microcontroller. The divided voltage V3 read by the microcontroller depends on the electromagnetic field in which the antenna 12 is buried and by means of a suitable calibration, this voltage V3 is converted into a measurement of the value of the magnetic field in Ampere per meter, which represents a physical quantity proportional to the quantity of the electromagnetic field that passes through the antenna. This value is made legible or audible by means of field indicators directly powered by the microcontroller. In this manner, depending on the electromagnetic field in which the antenna is exposed, certain indicators are activated and others are not. In order to consume the same quantity of energy and therefore to present a constant load, there is always only one indicator activated at a time.

In our example, the first light emitting diode is a red diode that comes on when the field is insufficient to enable good communication with the contactless portable object designed to communicate. This is a field whose value is less than 1 Ampere per meter (A/m). Similarly, the last diode is red and comes on when the electromagnetic field has a value greater than 7.5 A/m. Between these two diodes that represent the indicators for low and high limits of the electromagnetic field allowable for the exchange of data between a contactless card and a reader, the 10 intermediate diodes successively indicate a field of 1, 1.5, 2, 2.5, 3, 3.5, 4, 5, 6 and 7 A/m. These values are not restrictive and the set of diodes could also provide another scale of values without necessarily deviating from the scope of the invention. However, the interval covered by these values corresponds to the interval of ISO values in which a contactless portable object reader operates at the frequency of 13.56 MHz. The 12 light emitting diodes thus enable an easy and immediate reading of the field in which is buried the contactless card according to the invention.

When the antenna 12 is not in a carrier frequency field, it does not resonate with the reader and the electronic circuit 14 is no longer powered and no field indicator is activated. In this case, the contactless card according to the invention indicates by its inactivity the complete absence of any electromagnetic field and thus the inability to communicate between any contactless portable object and the reader.

According to a variant of the invention, the field indicators may be audible. In this case, these are devices that produce a characteristic sound when a voltage is applied to them such as a buzzer or a beeper that will emit a different sound or else a sequence of different sounds according to the value of the electromagnetic field in which the antenna is buried. According to another variant, the field indicators can be visual as well as audible by combining light emitting diodes and a buzzer on the same contactless card according to the invention. In this case, both types of indicators can operate simultaneously or else, by adding a switching function in the electronic circuit and a user interface such as a push button, we can switch from one indicator to another by keeping the button pressed.

According to another variant of the embodiment, the set of indicators features a liquid crystal (LCD) or other (OLED) type of digital display device that provides the value of the magnetic field in Ampere per meter.

The physical quantity measured can be, according to another embodiment of the invention, a time measured in milliseconds (ms) corresponding to the time of exposure to the electromagnetic field of the contactless card according to the invention and represents a physical quantity proportional to the quantity of the electromagnetic field that passes through the antenna. In this case, each diode corresponds to a duration, for example 5 ms, so that an exposure to the field for 15 ms turns on 3 diodes. The lighting of diodes can be in this case persistent, which enables the user to see the information even when the card is no longer exposed to the field. This function can be programmed in the microcontroller and can be accessed by the user through an interface such as a push button. The push button thus enables the user to measure with the card according to the invention, either the value of this magnetic field in Ampere per meter or the time of exposure of the card to the electromagnetic field. By operating according to the described and preferred embodiment of the invention, the card measures a value of the electromagnetic field whereas pressing on the switch thus allows the user to measure a time of exposure to the electromagnetic field.

Advantageously, the contactless card according to the invention is an adjustment and diagnostic tool to help the technician in the installation and maintenance of any system integrating the contactless cards technology.

In addition, the contactless card according to the invention helps in the development, testing and evaluation of contactless portable object readers.

For this, it is important to specify that the size and design of the contactless card's antenna according to the invention must be similar to those of contactless portable objects with which the reader is designed to communicate. The measurement of the electromagnetic field corresponds to the quantity of energy that passes through the turns of the antenna over their entire surface and does not correspond therefore to a localized measurement of the field but actually corresponds to the measurement of the actual and average field that passes through a contactless portable object designed to communicate with the reader.

The contactless card according to the invention provides an indication that reflects the actual behavior of the use of a contactless card complying with ISO14443 and showing a load among the strictest ones within this standard.

The invention claimed is:

1. A contactless portable object comprising an electronic circuit and an antenna connected together enabling coupling between the electronic circuit and a reader associated with the portable contactless object,
    wherein the contactless portable object includes a set of field indicators that provide to the user a measurement of the value of a physical quantity proportional to the quantity of the electromagnetic field which passes through said antenna,
    wherein only one field indicator is activated at any time, and
    wherein said set of field indicators are remotely powered by said reader,
    wherein said physical quantity is selected from the group consisting of the value of the electromagnetic field in Ampere per meter that passes through said antenna and the time of exposure of said antenna to the electromagnetic field in milliseconds, and
    further comprising a user interface which enables a user to change from the measurement of the electromagnetic field to the measurement of the time of exposure to the electromagnetic field.

2. The contactless portable object according to claim 1, wherein said set of indicators is marked by visual means.

3. The object according to claim 2, wherein said set of indicators comprises a digital display device.

4. The object according to claim 2, wherein the visual means are light emitting diodes.

5. The contactless portable object according to claim 1, wherein said set of indicators comprises audible means.

6. The contactless portable object according to claim 1, wherein said set of indicators comprises visual and audible means.

7. The contactless portable object according to claim 1, whose format is 85.6 mm×54 mm.

8. A contactless portable object comprising an electronic circuit and an antenna connected together enabling coupling between the electronic circuit and a reader associated with the portable contactless object,
    wherein the contactless portable object includes a set of field indicators that provide to the user a measurement of the value of a physical quantity proportional to the quantity of the electromagnetic field which passes through said antenna,
    wherein only one field indicator is activated at any time,
    wherein said set of field indicators are remotely powered by said reader,
    wherein said set of indicators comprises visual means which are light emitting diodes,
    wherein the light emitting diodes indicate, through two red diodes, values of the field that are unacceptable for the exchange of data between a contactless card and a reader and, through a plurality of intermediate diodes, a measurement scale for the field between 1 and 7 Amperes per meter.

* * * * *